United States Patent
Shin

(10) Patent No.: US 10,479,316 B2
(45) Date of Patent: Nov. 19, 2019

(54) AIRBAG APPARATUS FOR VEHICLE

(71) Applicants: Hyundai Motor Company, Seoul (KR); Kia Motors Corporation, Seoul (KR)

(72) Inventor: Hyo Shub Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 88 days.

(21) Appl. No.: 15/823,977

(22) Filed: Nov. 28, 2017

(65) Prior Publication Data

US 2018/0334131 A1 Nov. 22, 2018

(30) Foreign Application Priority Data

May 19, 2017 (KR) .......................... 10-2017-0062328

(51) Int. Cl.
*B60R 21/263* (2011.01)
*B60R 21/013* (2006.01)
(Continued)

(52) U.S. Cl.
CPC .......... *B60R 21/263* (2013.01); *B60R 21/013* (2013.01); *B60R 21/217* (2013.01); *B60R 21/231* (2013.01); *B60R 2021/0009* (2013.01); *B60R 2021/0044* (2013.01); *B60R 2021/0048* (2013.01); *B60R 2021/01211* (2013.01);
(Continued)

(58) Field of Classification Search
CPC ... B60R 21/263; B60R 21/217; B60R 21/231; B60R 21/013; B60R 2021/2633; B60R 2021/01211; B60R 2021/23107; B60R 2021/0044; B60R 2021/0009; B60R 2021/0048

See application file for complete search history.

(56) References Cited

U.S. PATENT DOCUMENTS 9,566,929 B1 * 2/2017 Belwafa ................ B60R 21/205
9,731,677 B1 * 8/2017 Belwafa ................ B60R 21/233
(Continued)

FOREIGN PATENT DOCUMENTS

JP 2005-132292 A 5/2005
JP 2011-168128 A 9/2011
(Continued)

*Primary Examiner* — Drew J Brown
(74) *Attorney, Agent, or Firm* — Morgan, Lewis & Bockius LLP

(57) ABSTRACT

An airbag apparatus for a vehicle may include first and second inflators each configured to provide an inflation gas; a main cushion connected to the first inflator and deploying toward a passenger when the first inflator operates; a sub cushion connected to the second inflator and deploying along a first side surface of the main cushion to be overlappingly deployed with the main cushion at the first side surface and the front surface of the main cushion when the second inflator operates; and a controller configured to operate the first inflator to deploy the main cushion when a vehicle collision is detected, and configured to operate both of the first inflator and the second inflator to deploy both of the main cushion and the sub cushion when the vehicle collision is detected as an oblique collision at a least a predetermined angle.

15 Claims, 11 Drawing Sheets

(51) Int. Cl.
  *B60R 21/217* (2011.01)
  *B60R 21/231* (2011.01)
  *B60R 21/00* (2006.01)
  *B60R 21/01* (2006.01)

(52) U.S. Cl.
  CPC .............. *B60R 2021/23107* (2013.01); *B60R 2021/2633* (2013.01)

(56) References Cited

U.S. PATENT DOCUMENTS

| | | | |
|---|---|---|---|
| 10,059,299 B2* | 8/2018 | Yamada | B60R 21/205 |
| 2012/0032425 A1* | 2/2012 | Kwon | B60R 21/0134 |
| | | | 280/730.2 |
| 2015/0258959 A1* | 9/2015 | Belwafa | B60R 21/233 |
| | | | 280/729 |
| 2015/0343986 A1* | 12/2015 | Schneider | B60R 21/205 |
| | | | 280/729 |
| 2015/0367802 A1* | 12/2015 | Fukawatase | B60R 21/205 |
| | | | 280/732 |
| 2016/0009242 A1* | 1/2016 | Fukawatase | B60R 21/2338 |
| | | | 280/730.1 |
| 2016/0297393 A1* | 10/2016 | Fukawatase | B60R 21/231 |
| 2017/0072897 A1* | 3/2017 | Kruse | B60R 21/239 |
| 2017/0158154 A1* | 6/2017 | Kobayashi | B60R 21/231 |
| 2018/0037188 A1* | 2/2018 | Ohno | B60R 21/262 |
| 2018/0056920 A1* | 3/2018 | Paxton | B60R 21/233 |
| 2018/0056922 A1* | 3/2018 | Yamada | B60R 21/205 |
| 2018/0065581 A1* | 3/2018 | Ohno | B60R 21/01558 |
| 2018/0065583 A1* | 3/2018 | Tabushi | B60R 21/233 |
| 2018/0065587 A1* | 3/2018 | Maenishi | B60R 21/205 |
| 2018/0154857 A1* | 6/2018 | Yamada | B60R 21/231 |
| 2018/0208143 A1* | 7/2018 | Fischer | B60R 21/205 |
| 2019/0111882 A1* | 4/2019 | Kim | B60R 21/231 |

FOREIGN PATENT DOCUMENTS

| | | |
|---|---|---|
| JP | 5295820 B2 | 6/2013 |
| JP | 2015-077889 A | 4/2015 |
| KR | 10-2012-0138461 A | 12/2012 |
| KR | 10-2016-0025369 A | 3/2016 |

* cited by examiner

AIRBAG APPARATUS FOR VEHICLE

CROSS-REFERENCE(S) TO RELATED APPLICATIONS

The present application claims priority to Korean Patent Application No. 10-2017-0062328, filed on May 19, 2017, the entire contents of which is incorporated herein for all purposes by the present reference.

BACKGROUND OF THE INVENTION

Field of the Invention

The present invention relates to an airbag apparatus for a vehicle configured for reducing an injury to a passenger in the event of an oblique collision of a vehicle by applying a separate cushion for assisting an airbag cushion.

Description of Related Art

Generally, a vehicle is provided with a steering wheel disposed in front of a driver's seat to steer wheels, in which the steering wheel is provided with an airbag apparatus that is deployed toward a driver to protect the driver in the event of a vehicle collision.

Such an airbag apparatus is configured to be deployed between the steering wheel and a driver before the driver's head or chest contacts the steering wheel, preventing the driver's head or chest from colliding with the steering wheel.

In addition, to protect a passenger, a passenger airbag, a curtain airbag, a roof airbag, or the like, deployed in the event of the vehicle collision are disposed at various positions in a vehicle.

Recently, various regulations have been enacted for safety of a passenger. It is necessary to protect a passenger who is inclined by 15° in the event of the vehicle collision. In addition, the passenger needs to be able to be protected even when the vehicle collision occurs when a passenger and the airbag are far away from each other.

Various aspects of the present invention are directed to providing an airbag apparatus for a vehicle meeting such regulations.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an airbag apparatus for a vehicle configured for minimizing a time taken to deploy airbag cushions while providing an airbag configured for coping with collision situations of a vehicle.

According to an exemplary embodiment of the present invention, there is provided an airbag apparatus for a vehicle, including: a first inflator and a second inflator configured to provide an inflation gas; a main cushion configured to be connected to the first inflator and deployed in a passenger direction when the first inflator is operated; a sub cushion configured to be connected to the second inflator and deployed along a first side surface of the main cushion and bent at a front portion to be deployed along a front surface of the main cushion when the second inflator is operated to be overlappingly deployed with the main cushion at the first side surface and the front surface of the main cushion; and a controller configured to operate the first inflator when a collision situation of the vehicle is detected and to deploy the main cushion and operate both of the first inflator and the second inflator when the vehicle collision is detected as an oblique collision of a predetermined angle or more, deploying both of the main cushion and the sub cushion.

Each of the main cushion and the sub cushion may be independently connected to the first inflator and the second inflator.

The first inflator and the second inflator may be mounted internally in a single airbag housing.

The sub cushion may include: a passage portion configured to be deployed along the first side surface of the main cushion by being supplied with the inflation gas from the second inflator and overlap with the first side surface of the main cushion; and a loading portion configured to extend from a front end of the passage portion to be supplied with the inflation gas and be overlappingly deployed with the front surface of the main cushion.

The sub cushion may be mounted in the airbag housing in a state in which the passage portion is coupled to a cover of the first side surface of the main cushion and the loading portion is coupled to a cover of the front surface of the main cushion.

The passage portion of the sub cushion may be formed in an 'H'-letter shape and may include an upper chamber configured to connect between the second inflator and the loading portion at an upper portion of the main cushion, a lower chamber configured to connect between the second inflator and the loading portion at a lower portion of the main cushion, and a connection chamber configured to connect between the upper chamber and the lower chamber.

The passage portion of the sub cushion may include a protruding chamber configured to be formed in a circular or rectangular shape to protrude in one side direction of the main cushion when being deployed while being connected to the second inflator, and a transfer chamber configured to surround a circumference of the protruding chamber and connect between the second inflator and the loading portion.

The passage portion of the sub cushion may connect between the second inflator and the loading portion and may be formed in a zigzag-shape to pass through the upper portion and the lower portion of one side surface of the main cushion.

The passage portion of the sub cushion may connect between the second inflator and the loading portion, and may be formed in a circular or rectangular shape to protrude in one side direction of the main cushion when being deployed.

The loading portion of the sub cushion may include: a transfer chamber configured to have air flow in a width direction of the main cushion; and a plurality of support chambers configured to extend in a vertical direction from the transfer chamber and be formed at points separated apart from each other by a predetermined distance.

The loading portion of the sub cushion may be formed wherein a height protruding from the front surface of the main cushion is gradually lowered as the loading portion of the sub cushion approaches the other side of the main cushion.

The loading portion of the sub cushion may be provided with a diffuser configured to support the loading portion in a protruding direction at a point communicating with the passage portion, and be provided with through holes configured to distribute inflation gas into the loading portion.

The loading portion of the sub cushion may be disposed with a one-way vent configured to be formed at a point connected to a passage portion and move the inflation gas only in a loading portion direction from the passage portion.

The main cushion may be provided with an active vent configured to selectively communicate between an internal volume with an external volume.

The controller may control the active vent to be open as long as a vehicle speed is equal to or greater than a predetermined speed and a passenger puts on a belt, when detecting a front collision of less than a predetermined angle.

The controller may operate both of the first inflator and the second inflator in a state in which a vehicle speed is equal to or greater than a predetermined speed, when detecting a front collision of less than a predetermined angle.

According to the airbag apparatus for a vehicle having the above-described structure, the sub cushion surrounding the front surface and one side surface of the main cushion is deployed together with the main cushion, wherein it is possible to improve the passenger protection capability of the airbag by increasing the side support force of the airbag while restricting the passenger at an early stage of the collision.

In addition, the main cushion and the sub cushion are each developed by different inflators, wherein it is possible to prevent the development performance from deteriorating due to the increase in the volume of the cushion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
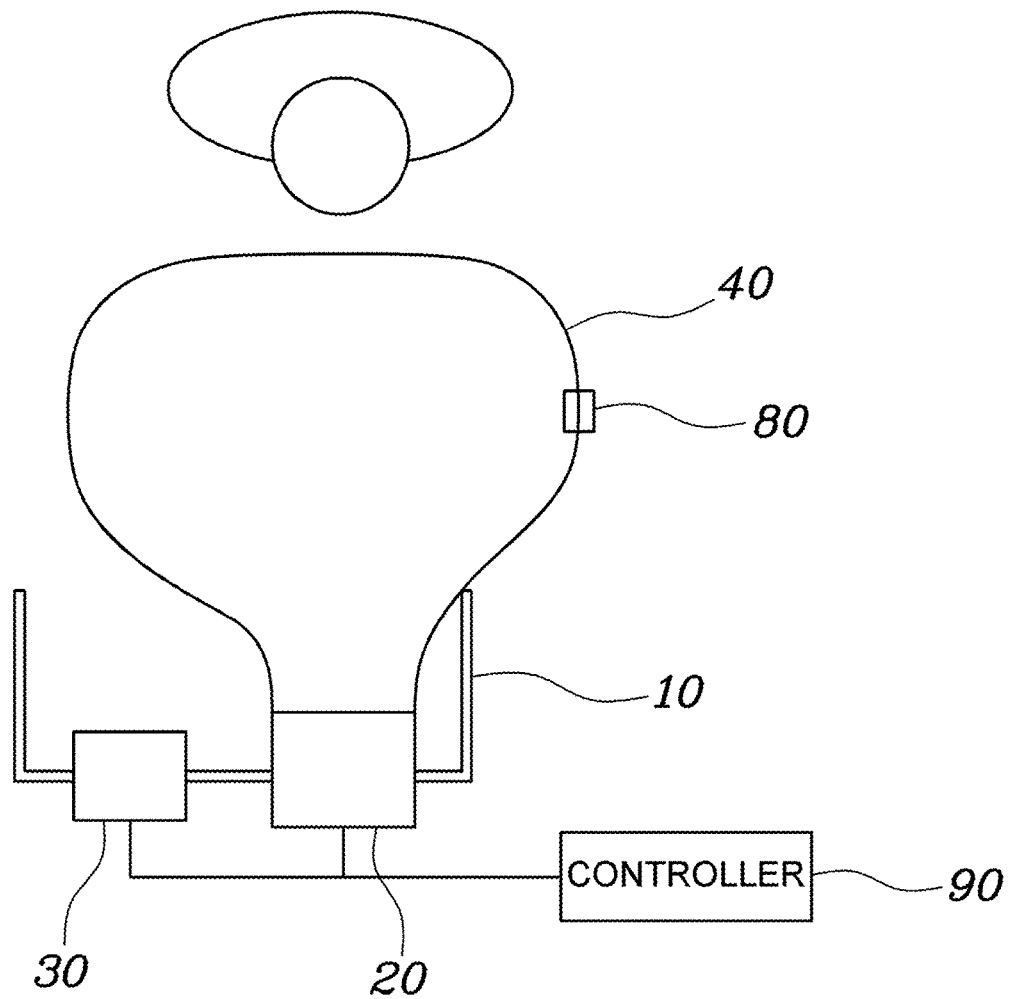
FIG. 1 and FIG. 2 are plan view showing a developed state of an airbag apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) intended to cover not only the exemplary embodiments, but also various alternatives, modifications, equivalents and other embodiments, which may be included within the spirit and scope of the invention as defined by the appended claims.

Figure 2:
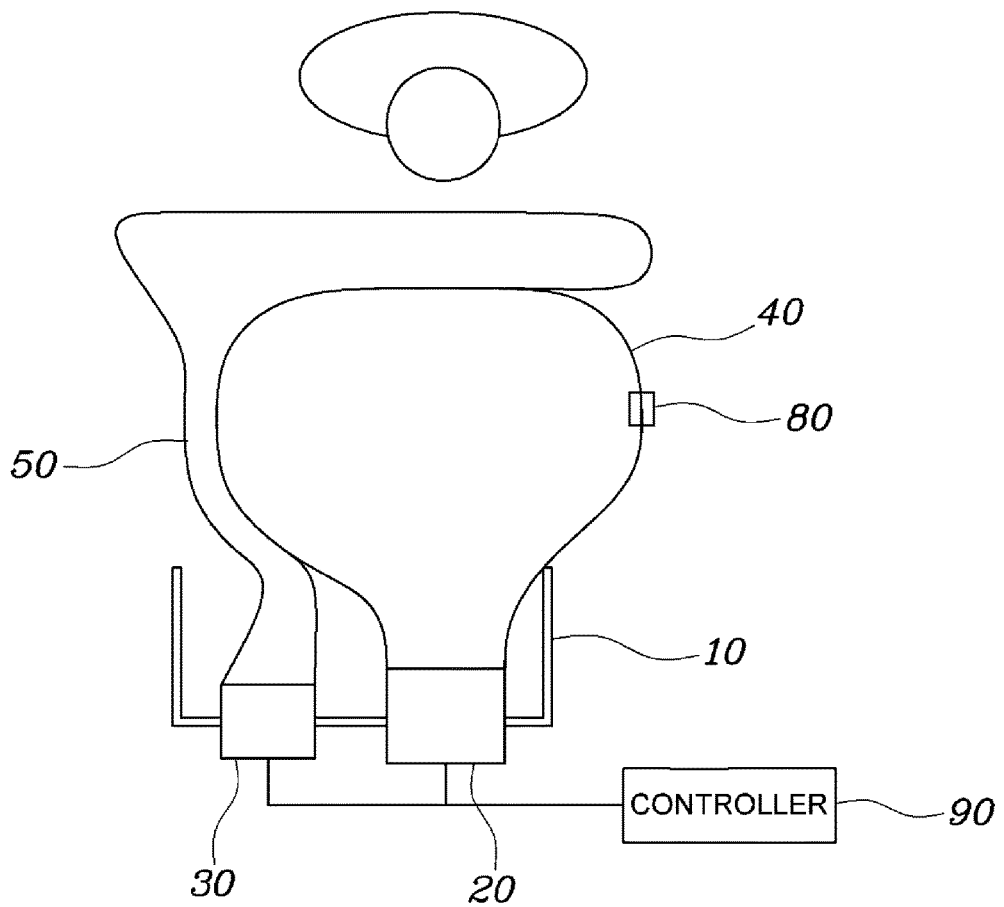

FIG. 1 and FIG. 2 are plan views showing a developed state of an airbag apparatus for a vehicle according to an exemplary embodiment of the present invention. Referring to FIG. 1 and FIG. 2, the airbag apparatus for a vehicle according to an exemplary embodiment of present invention may include a first inflator 20 and a second inflator 30 configured to provide an inflation gas; a main cushion 40 connected to the first inflator 20 and deployed in a passenger direction when the first inflator 20 is operated; a sub cushion 50 configured to be connected to the second inflator 30 and deployed along one side surface of the main cushion 40 and bent at a front portion thereof to be deployed along a front surface of the main cushion 40 when the second inflator 30 is operated and to be overlappingly deployed with the main cushion 40 at one side surface and the front surface of the main cushion 40; and a controller 50 configured to operate the first inflator 20 when a collision situation of the vehicle is detected to deploy the main cushion 40 and operate both of the first inflator 20 and the second inflator 30 when the vehicle collision is detected as an oblique collision of a predetermined angle or more, deploying both of the main cushion 40 and the sub cushion 50.

For ease of understanding, the airbag apparatus for a vehicle according to the exemplary embodiment of the present invention will be described on the basis of the application to a passenger airbag (PAB). However, since the present invention may also be applied to a driver's seat or a back seat airbag, it may not be construed as being limited to an airbag of a specific seat. In addition, the controller 90 may be an airbag controller (ACU) responsible for airbag control.

Each of the main cushion 40 and the sub cushion 50 in an exemplary embodiment of the present invention is independently connected to the first inflator 20 and the second inflator 30.

That is, the main cushion 40 is deployed by the operation of the first inflator 20, and thus it is deployed in a passenger direction in all cases where a vehicle collision occurs, protecting a passenger in the event of a vehicle collision.

Meanwhile, in the airbag apparatus for a vehicle according to the exemplary embodiment of the present invention, the sub cushion 50 is configured to be deployed by the operation of the second inflator 30 that is provided separately from the first inflator 20, and is deployed by the controller 90 when the vehicle obliquely collides at an angle equal to or greater than a predetermined angle.

When the sub cushion 50 is deployed by the second inflator 30, the sub cushion 50 is deployed along one side surface and the front surface of the main cushion 40 to overlap with one side surface and the front surface of the main cushion 40, restricting and protecting a passenger at an early stage and securing a side support force of the main cushion 40.

Here, one side surface of the main cushion 40 means a side facing a door trim with respect to the passenger airbag (PAB). Therefore, the sub cushion 50 is deployed between the main cushion 40 and the door trim, wherein the sub cushion 50 may prevent the main cushion 40 from rotating in a region between the main cushion 40 and the door trim in the event of the vehicle collision, securing the side support force of the main cushion 40. Further, the phenomenon that a passenger's head leans to the region between the main cushion 40 and the door trim due to the oblique collision, bumping a crash pad into a side window may be prevented.

The controller 90 according to the exemplary embodiment of the present invention unconditionally deploys the main cushion 40 by the first inflator 20 in the event of the vehicle collision, and deploys the sub cushion 50 by selectively operating the second inflator 30 only in the event of the oblique collision. Accordingly, it is possible to prevent a component replacement cost from increasing due to the unnecessary deployment of the sub cushion 50 in the event of the front collision of the vehicle.

In an exemplary embodiment of the present invention, the first inflator 20 and the second inflator 30 may be mounted inside a single airbag housing 10.

That is, the main cushion 40 and the sub cushion 50 are folded and stored in an airbag housing 10 and are each configured to be selectively deployed by the operation of the first inflator 20 or the second inflator 30, minimizing a volume package of the airbag apparatus for a vehicle. At the present time, the second inflator 30 is disposed at a position closer to the door trim than the first inflator 20 in the airbag housing 10.

In the airbag apparatus for a vehicle according to an exemplary embodiment of the present invention, the sub cushion 50 may include: a passage portion 55 configured to be supplied with the inflation gas from the second inflator 30 and deploy along one side surface of the main cushion 40, overlapping with one side surface of the main cushion 40; and a loading portion 53 configured to extend from the front of the passage portion 55 to be supplied with the inflation gas and be overlappingly deployed with the front surface of the main cushion 40.

Therefore, the loading portion 53 of the sub cushion 50 overlaps with the front surface of the main cushion 40 to contact a passenger's head in the event of the vehicle collision, restricting the passenger's head. The passage portion 55 prevents a passenger's head from rotating while provided as a passage for supplying the inflation gas of the second inflator 30 to the loading portion 53 and ensures the side support force of the main cushion 40.

The sub cushion 50 is mounted in the airbag housing 10 wherein the passage portion 55 is coupled to one side cover of the main cushion 40 and the loading portion 53 is coupled to a front cover of the main cushion 40.

That is, when the sub cushion 50 and the main cushion 40 are provided independently, the sub cushion 50 and the main cushion 40 are developed to deviate from each other, wherein the sub cushion 50 may not smoothly overlap one side surface and the front surface of the main cushion 40.

To prevent the present case, the sub cushion 50 and the main cushion 40 are configured to be coupled to each other, wherein the phenomenon that the sub cushion 50 and the main cushion 40 deviate from each other may be prevented.

The sub cushion 50 may be implemented as various exemplary embodiments.

FIG. 3, FIG. 4, FIG. 5, and FIG. 6 are side views showing the sub cushion passage portion of the airbag apparatus for a vehicle according to various exemplary embodiments of the present invention, and shows various exemplary embodiments of the passage portion 55 of the sub cushion 50.

Figure 3:
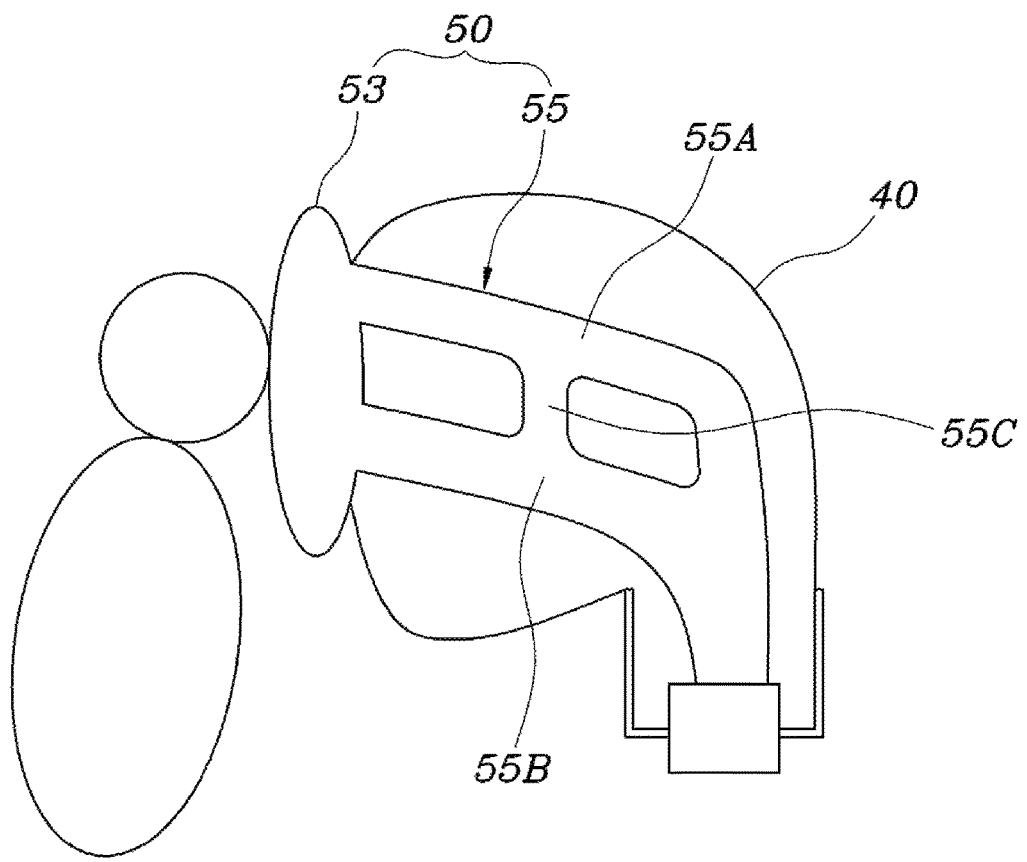
FIG. 3, FIG. 4, FIG. 5, and FIG. 6 are side views showing a sub cushion passage portion of the airbag apparatus for a vehicle according to various exemplary embodiments of the present invention.

For example, referring to FIG. 3, the passage portion 55 of the sub cushion 50 is formed in an 'H'-letter shape and may include an upper chamber 55A configured to connect between the second inflator 30 and the loading portion 53 on an upper side of the main cushion 40, a lower chamber 55B configured to connect between the second inflator 30 and the loading portion 53 on a lower side of the main cushion 40, and a connection chamber 55C configured to connect between the upper chamber 55A and the lower chamber 55B.

That is, the passage portion 55 of the sub cushion 50 is not formed to merely serve as a simple inflation gas flow passage, but also is formed in an 'H'-letter shape supporting an upper portion, a lower portion, and a middle portion of the main cushion 40, ensuring the side support force of the main cushion 40. Further, a passage through which the inflation gas is introduced into the loading portion 53 may be diversified to deploy the loading portion 53 in a balanced manner.

Figure 4:
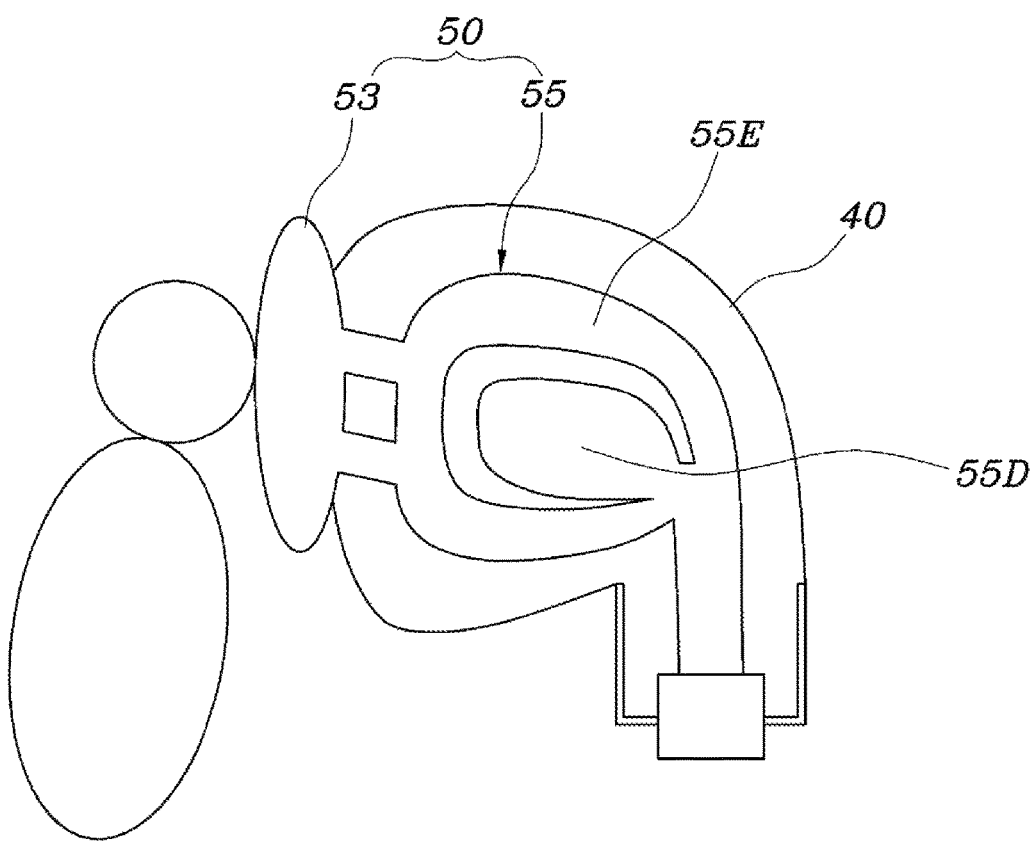

As another example, referring to FIG. 4, the passage portion 55 of the sub cushion 50 may include a protruding chamber 55D configured to be formed in a circular or rectangular shape to protrude in one side direction of the main cushion 40 when being deployed while being connected to the second inflator 30, and a transfer chamber 55E configured to surround a circumference of the protruding chamber 55D and connect between the second inflator 30 and the loading portion 53.

That is, the protruding chamber 55D may be formed in the passage portion 55 of the sub cushion 50 to effectively perform a role of the sub cushion 50 that prevents a passenger from moving to the region between the main cushion 40 and the door trim to collide with peripherals of the vehicle in the event of the vehicle collision.

Further, since the transfer chamber 55E is formed to surround the protruding chamber 55D, the transfer chamber 55E may be configured to pass through the upper portion and the lower portion of one side surface of the main cushion 40 to secure a side protective area and a support force of the main cushion 40.

Figure 5:
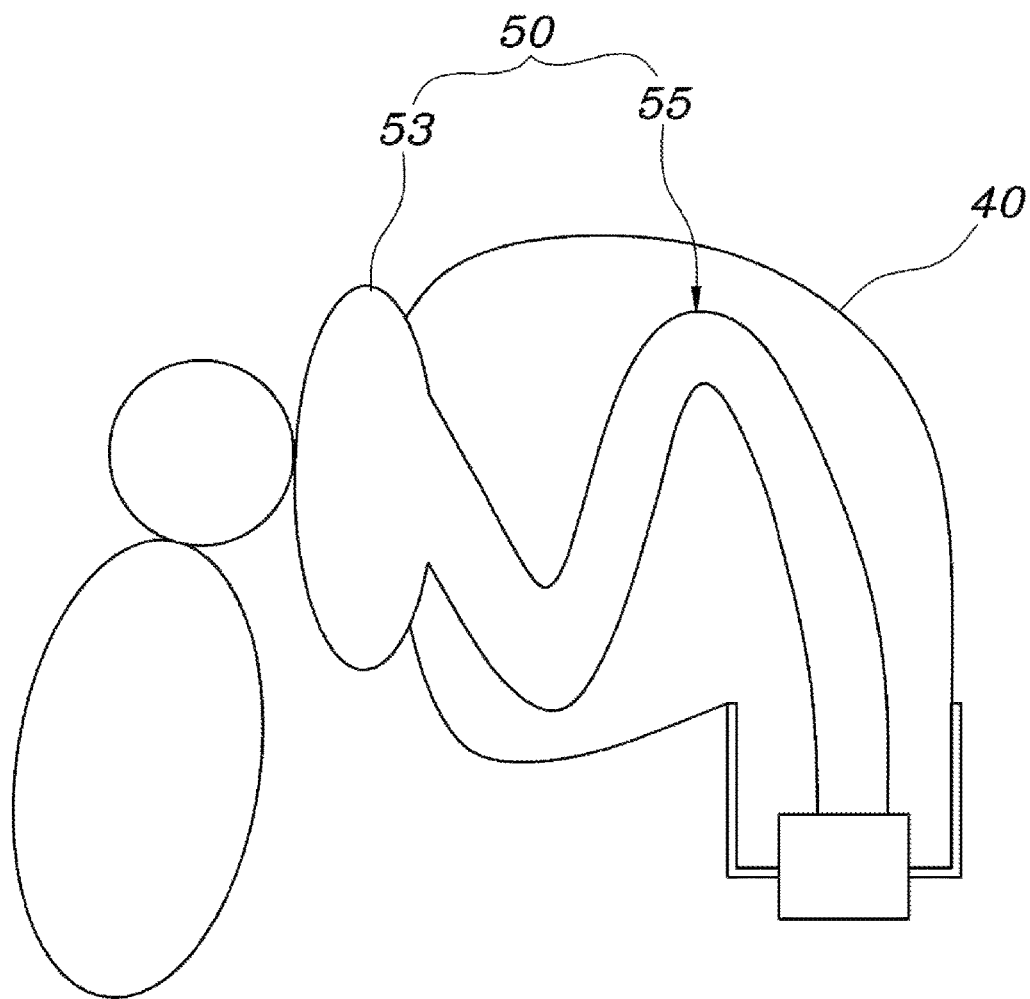

Further, referring to FIG. 5, the passage portion 55 of the sub cushion 50 connects between the second inflator 30 and the loading portion 53, and may be formed in a zigzag-shape, passing through the upper portion and the lower portion of one side surface of the main cushion 40.

When the passage portion 55 of the sub cushion 50 is formed in a zigzag-shape as described above, the passage portion 55 is provided as a single passage, wherein the sub cushion 50 may be rapidly deployed when the second inflator 30 is operated. In addition, it is possible to provide the side support force for the upper and lower portions of the main cushion 40.

Figure 6:
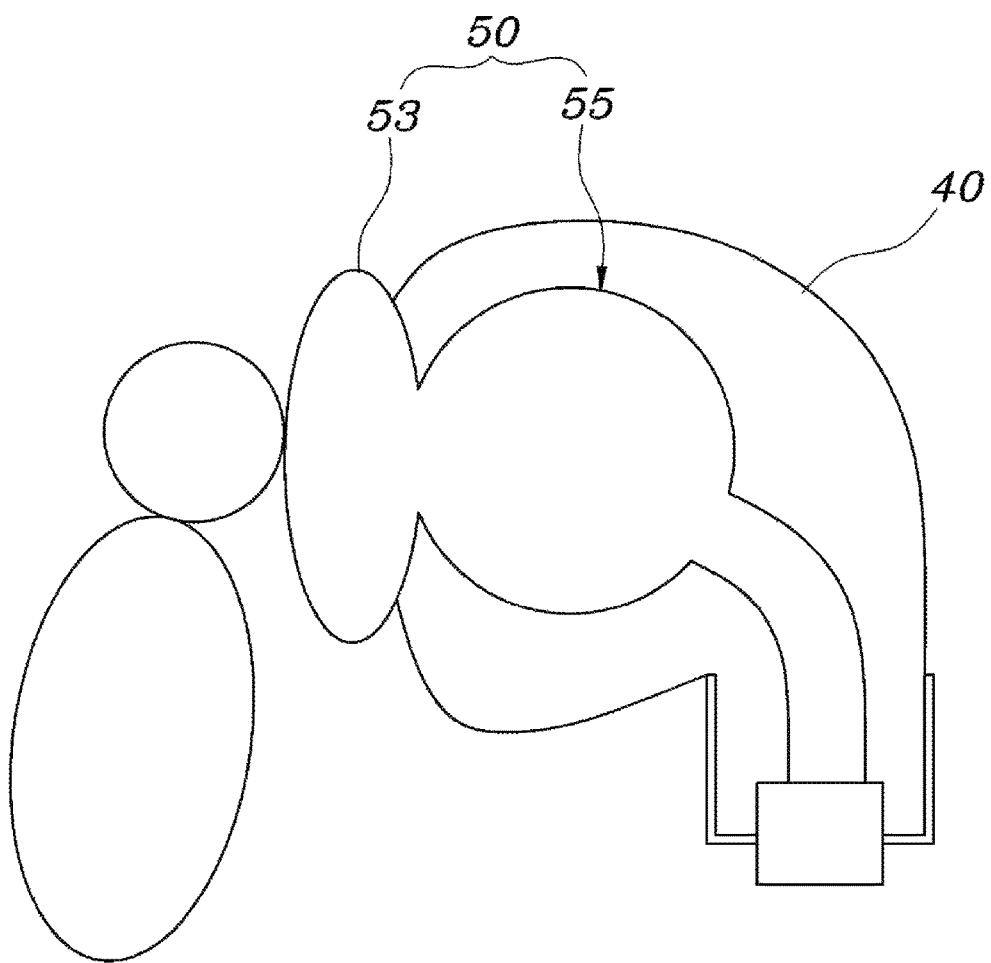

As another example, referring to FIG. 6, the passage portion 55 of the sub cushion 50 connects between the second inflator 30 and the loading portion 53, and may be formed in a circular or rectangular shape to protrude in one side direction of the main cushion 40 when being deployed.

According to the exemplary embodiment of the present invention, the passage portion 55 of the sub cushion 50 is formed to protrude toward one side of the main cushion 40, configured to transfer the inflation gas to the loading portion 53 while preventing a passenger from being injured due to the collision with vehicle parts when a passenger's head moves to the region between the main cushion 40 and the door trim.

Meanwhile, the loading portion 53 of the sub cushion 50 may also be provided in various exemplary embodiments.

Figure 7:
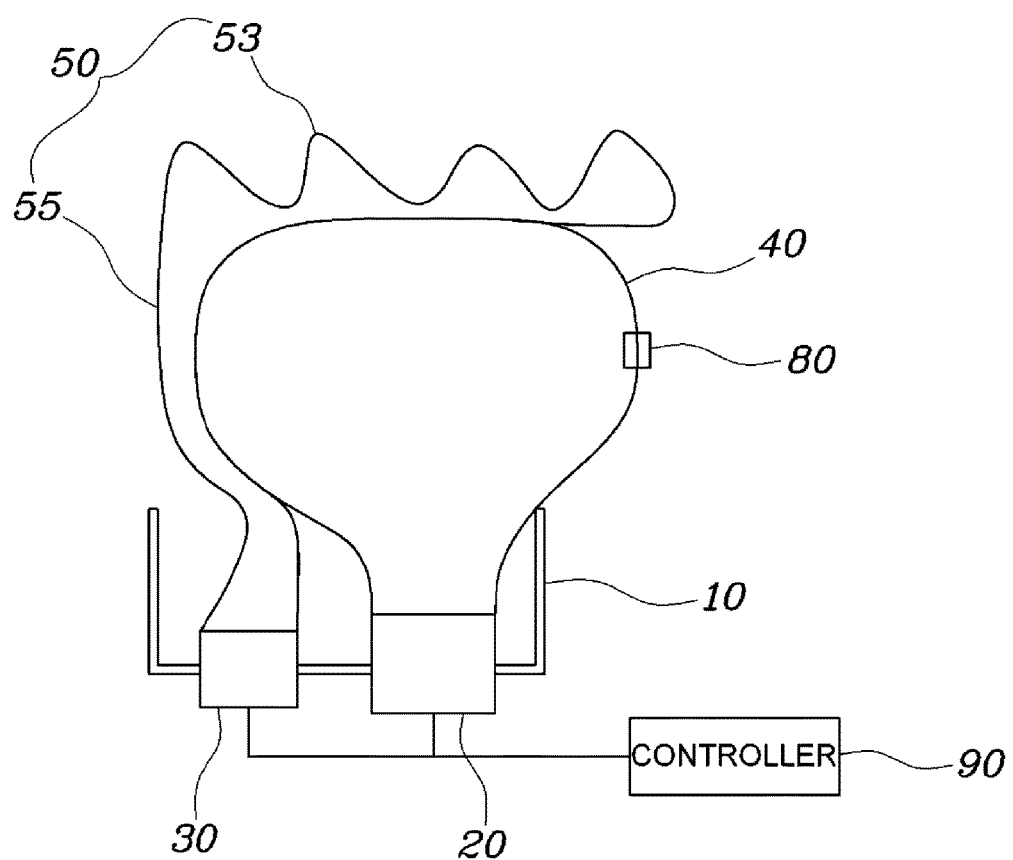
FIG. 7 is a plan view showing a sub cushion loading portion of an airbag apparatus for a vehicle according to the exemplary embodiment of the present invention.
Figure 8:
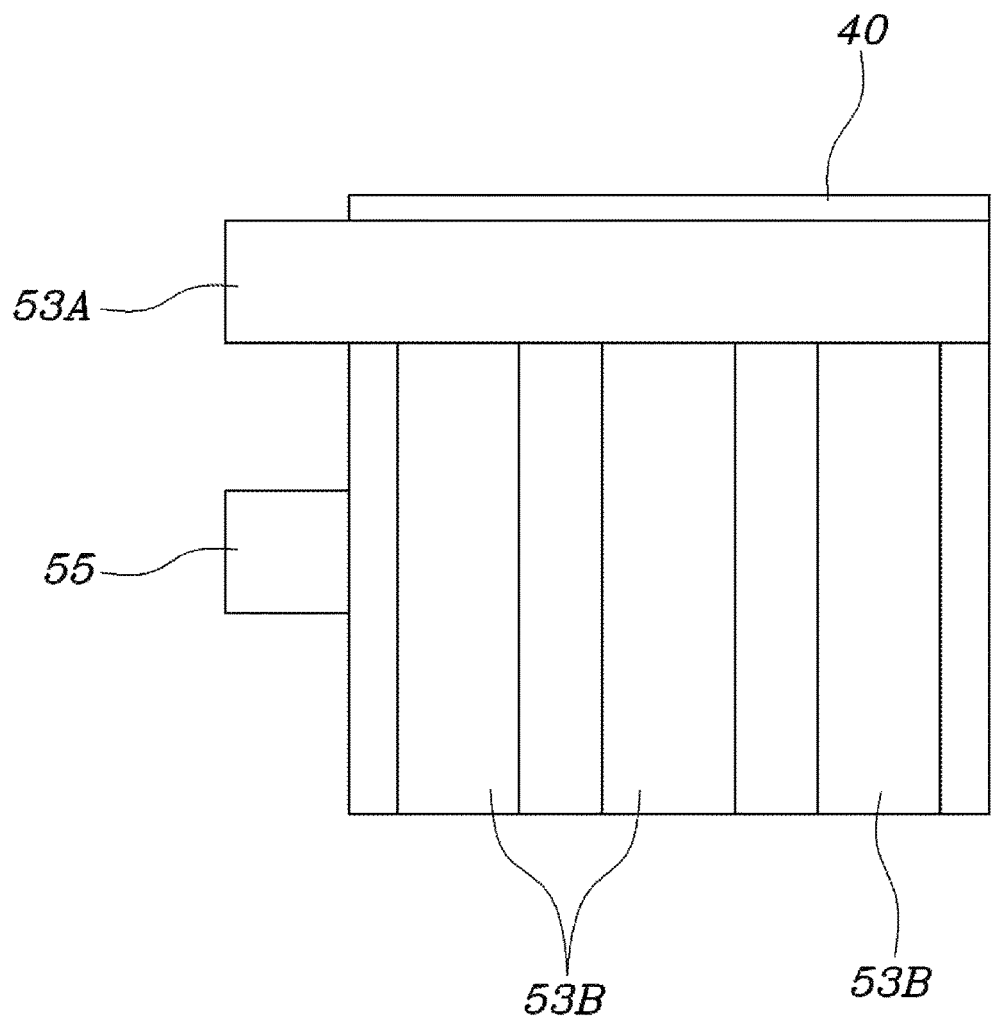
FIG. 8 is a front view showing the sub cushion loading portion of the airbag apparatus for a vehicle shown in FIG. 7.

FIG. 7 is a plan view showing a sub cushion loading portion of an airbag apparatus for a vehicle according to the exemplary embodiment of the present invention and FIG. 8 is a front view showing the sub cushion loading portion of the airbag apparatus for a vehicle shown in FIG. 7.

Referring to FIG. 7 and FIG. 8, the loading portion 53 of the sub cushion 50 according to an exemplary embodiment of the present invention may include a transfer chamber 53A configured to have air flow in a width direction of the main cushion 40; and a plurality of support chambers 53B configured to extend in a vertical direction from the transfer chamber 53A and be formed at points separated apart from each other by a predetermined distance.

In the event of the oblique collision of a vehicle, a major focus for protecting a passenger is configured to prevent a passenger's head from rotating. Accordingly, the loading portion 53 of the sub cushion 50 according to the exemplary embodiment includes the plurality of support chambers 53B extending in the vertical direction on the front surface of the main chamber 40, in which the support chambers 53B adjacent to each other are each formed at points separated apart from each other by a predetermined distance, wherein the passenger's head is loaded between the support chambers 53B when being loaded into the sub cushion 50, preventing the passenger's head from rotating in the event of the oblique collision.

Meanwhile, the transfer chamber 53A is formed to extend in the width direction of the main cushion 40 and configured to distribute the inflation gas into the plurality of support chambers 53B.

Figure 9:
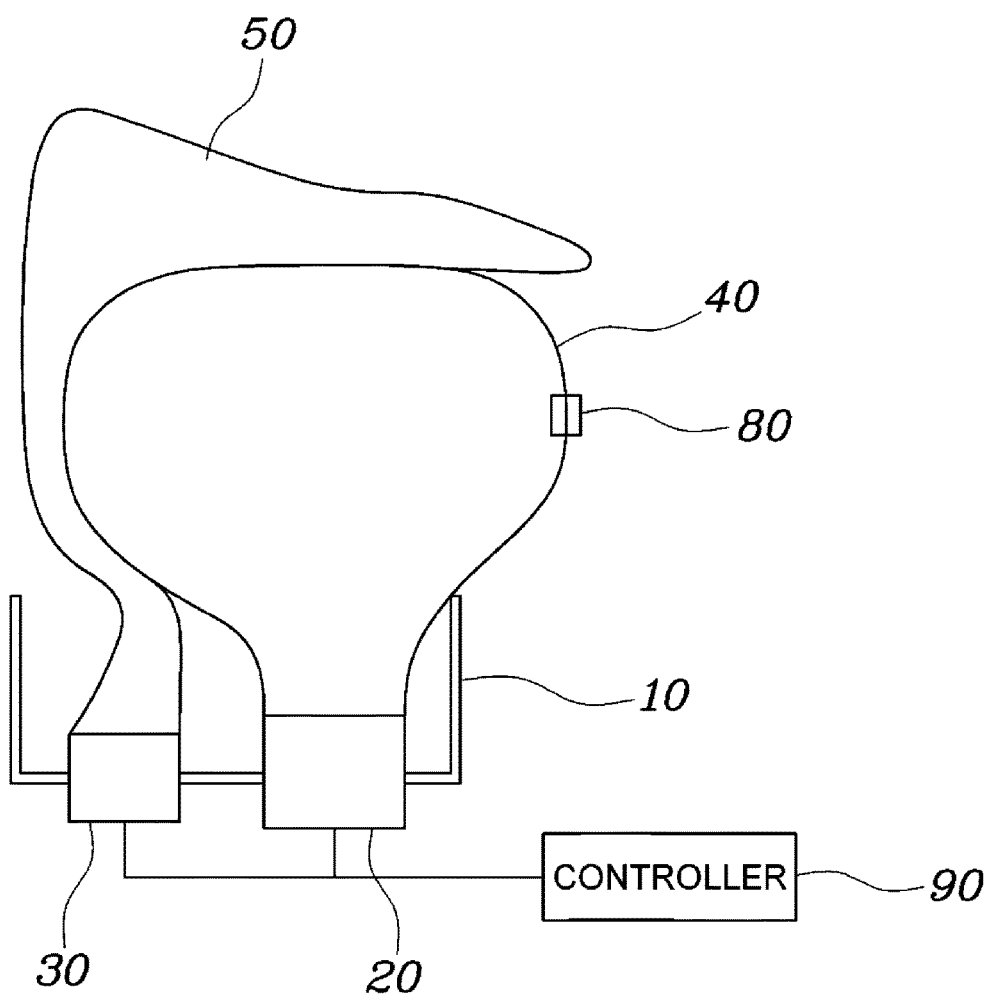
FIG. 9 is a plan view showing a sub cushion loading portion of an airbag apparatus for a vehicle according to another exemplary embodiment of the present invention.
Figure 10:
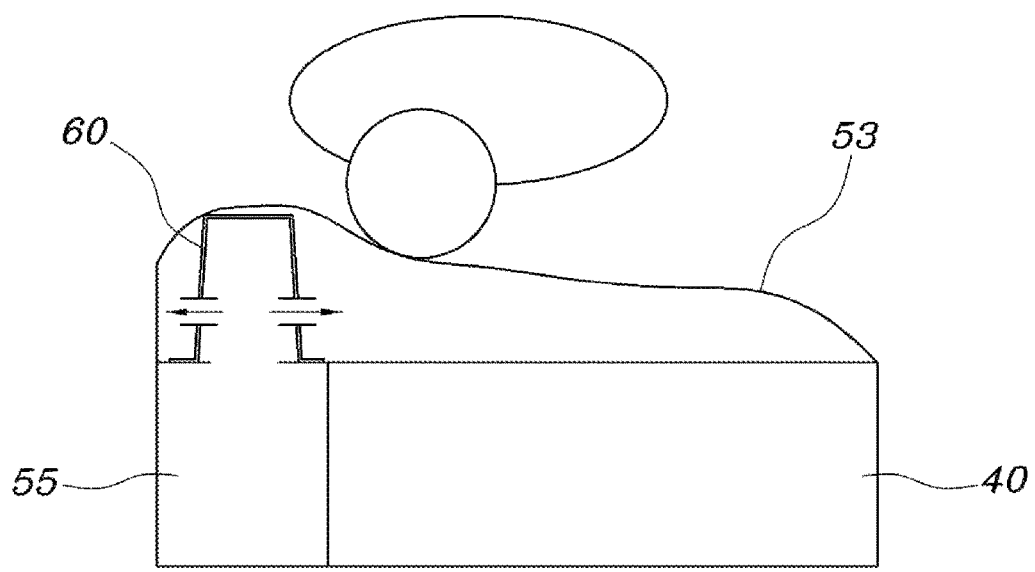
FIG. 10 is a cross-sectional view showing in detail a sub cushion of the airbag apparatus for a vehicle shown in FIG. 9 viewed from top.

FIG. 9 is a plan view showing a sub cushion loading portion of an airbag apparatus for a vehicle according to another exemplary embodiment of the present invention, and FIG. 10 is a cross-sectional view showing in detail a sub cushion of the airbag apparatus for a vehicle shown in FIG. 9 viewed from top.

Referring to FIG. 9 and FIG. 10, the loading portion 53 of the sub cushion 50 is formed wherein a height protruding from the front surface of the main cushion 40 is gradually lowered as the loading portion 53 of the sub cushion 50 approaches the other side of the main cushion 40.

That is, as shown in FIG. 10, since the loading portion 53 of the sub cushion 50 is formed to be inclined, the passenger's head being loaded due to the oblique collision may be effectively restrained, preventing a passenger's head from being transferred out of the airbag, preventing the passenger from being injured.

At the present time, the loading portion 53 of the sub cushion 50 may be disposed with a diffuser 60 configured to support the loading portion 53 in the protruding direction at a point communicating with the passage portion 55, and be provided with through holes configured to distribute inflation gas into the loading portion 53.

That is, the diffuser 60, which supports the loading portion 53 of the inclined sub cushion 50 while configured to distribute the inflation gas input from the passage portion 55 into the loading portion 53, may be applied to the internal of the loading portion 53.

Therefore, the loading portion 53 may be physically implemented in an inclined shape by the diffuser 60 and the speed at which the sub cushion 50 is deployed may be slowed down by the diffuser 60, wherein the sub cushion 50 may be deployed to be inclined in a passenger direction when being deployed naturally.

Meanwhile, in an exemplary embodiment of the present invention, the loading portion 53 of the sub cushion 50 may be provided with a one-way vent 70 configured to be formed at a point connected to the passage portion 55 and have inflation gas flow only in the direction of the loading portion 53 from the passage portion 55.

Figure 11:
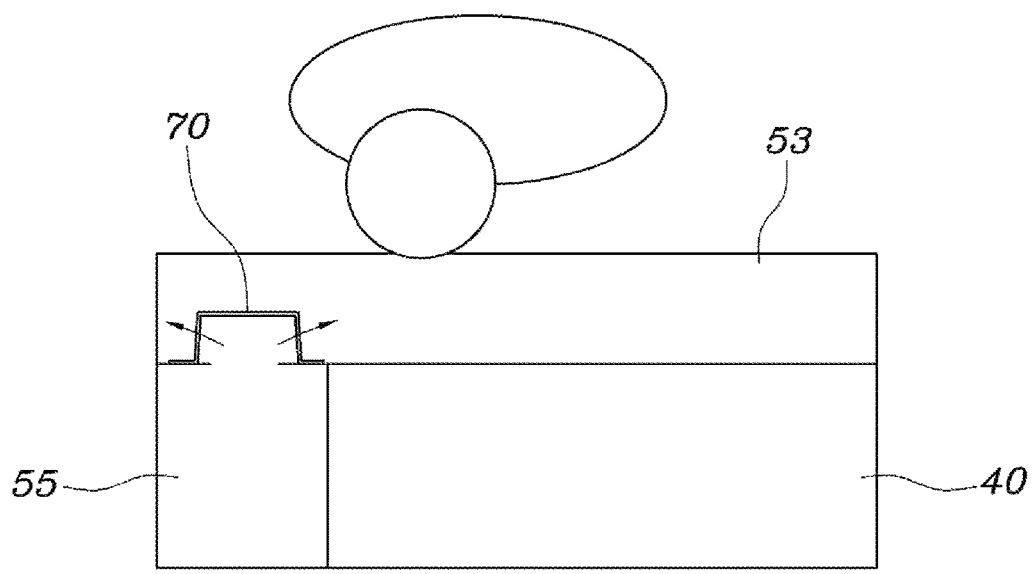
FIG. 11 is a cross-sectional view showing in detail the sub cushion of the airbag apparatus for a vehicle according to the exemplary embodiment of the present invention viewed from top.

FIG. 11 is a cross-sectional view showing in detail the sub cushion of the airbag apparatus for a vehicle according to the exemplary embodiment of the present invention viewed from top. Referring to FIG. 11, the one-way vent 70 is applied to a point connected to the passage portion 55 in the loading portion 53 of the sub cushion 50, wherein the inflation gas may be prevented from reflowing from the loading portion 53 to the passage portion 55.

Therefore, the one-way vent 70 maintains an internal pressure of the loading portion 53 of the sub cushion 50 to provide a sufficient support pressure even when the passenger's head is loaded, protecting the passenger.

Further, the main cushion 40 of the airbag apparatus for a vehicle according to an exemplary embodiment of the present invention may be provided with an active vent 80 for selectively communicating an internal volume with an external volume.

When the controller 90 detects a front collision of less than a predetermined angle, the controller 90 may control the active vent 80 to be open as long as a vehicle speed is equal to or greater than a predetermined speed and a passenger puts on a belt.

That is, the controller 90 operates the first inflator 20 in the front collision situation to deploy only the main chamber 40, and may open the active vent 80 to prevent a passenger from being secondarily injured due to the internal pressure of the main chamber 40 since the forward movement of the passenger is generally restricted, when the vehicle collision occurs during high-speed traveling while a passenger is wearing the belt.

Therefore, a passenger is buffered by the main cushion 40 and thus may be prevented from being secondarily injured.

The controller 90 can operate both of the first inflator 20 and the second inflator 30 when the front collision is detected to be less than a predetermined angle and the vehicle speed is equal to or greater than the predetermined speed.

In other words, even when the front collision situation of the vehicle occurs, the controller 90 may operate both of the first and second inflator 20 and 30 in the state in which a vehicle collision occurs during the high-speed traveling, wherein the passenger protection may be achieved as a highest priority.

According to the airbag apparatus for a vehicle having the above-described structure, the sub cushion surrounding the front surface and one side surface of the main cushion is deployed together with the main cushion, wherein it is possible to improve the passenger protection capability of the airbag by increasing the side support force of the airbag while restricting the passenger at an early stage of the collision.

In addition, the main cushion and the sub cushion are each developed by different inflators, wherein it is possible to prevent the development performance from deteriorating due to the increase in the volume of the cushion.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus for a vehicle, the airbag apparatus comprising:
    a first inflator and a second inflator each configured to provide an inflation gas;
    a main cushion connected to the first inflator and configured to deploy in a predetermined direction when the first inflator is operated;
    a sub cushion connected to the second inflator and configured to deploy along a first side surface of the main cushion and bent at a front portion to be deployed along a front surface of the main cushion to be overlappingly deployed with the main cushion at the first side surface and the front surface of the main cushion when the second inflator operates; and
    a controller configured to operate the first inflator to deploy the main cushion when a vehicle collision is detected, and configured to operate both of the first inflator and the second inflator to deploy both of the main cushion and the sub cushion when the vehicle collision is detected as an oblique collision at an angle equal to or greater than a predetermined angle,
    wherein the controller is configured to operate both of the first inflator and the second inflator when a vehicle speed is equal to or greater than a predetermined speed, when detecting a front collision of less than the predetermined angle.

2. The airbag apparatus of claim 1, wherein each of the main cushion and the sub cushion is independently connected to the first inflator and the second inflator.

3. The airbag apparatus of claim 1, wherein the first inflator and the second inflator are mounted inside a single airbag housing.

4. The airbag apparatus of claim 1, wherein the sub cushion includes:
    a passage portion configured to be deployed along the first side surface of the main cushion by being supplied with the inflation gas from the second inflator and to overlap with the first side surface of the main cushion; and
    a loading portion extending from a front portion of the passage portion to be supplied with the inflation gas and configured to be overlappingly deployed with the front surface of the main cushion.

5. The airbag apparatus of claim 4, wherein the sub cushion is mounted in the airbag housing when the passage portion is coupled to a cover of the first side surface of the main cushion, and the loading portion is coupled to a cover of the front surface of the main cushion.

6. The airbag apparatus of claim 4, wherein the passage portion of the sub cushion is formed in an 'H'-letter shape and includes an upper chamber configured to connect between the second inflator and the loading portion at an upper portion of the main cushion, a lower chamber configured to connect between the second inflator and the loading portion at a lower portion of the main cushion, and a connection chamber configured to connect between the upper chamber and the lower chamber.

7. The airbag apparatus of claim 4, wherein the passage portion of the sub cushion includes a protruding chamber configured to be formed in a circular or rectangular shape to protrude in a first side direction of the main cushion when being deployed while being connected to the second inflator, and a transfer chamber configured to surround a circumference of the protruding chamber and connect between the second inflator and the loading portion.

8. The airbag apparatus of claim 4, wherein the passage portion of the sub cushion connects between the second inflator and the loading portion and is formed in a zigzag-shape to pass through an upper portion and a lower portion of the first side surface of the main cushion.

9. The airbag apparatus of claim 4, wherein the passage portion of the sub cushion connects between the second inflator and the loading portion, and is formed in a circular or rectangular shape to protrude in a first side direction of the main cushion when being deployed.

10. The airbag apparatus of claim 4, wherein the loading portion of the sub cushion includes:
    a transfer chamber having air flow in a width direction of the main cushion; and
    a plurality of support chambers configured to extend in a vertical direction thereof from the transfer chamber and be formed at points separated apart from each other by a predetermined distance.

11. The airbag apparatus of claim 4, wherein the loading portion of the sub cushion is formed wherein a height protruding from the front surface of the main cushion is lowered as the loading portion of the sub cushion approaches a second side of the main cushion.

12. The airbag apparatus of claim 11, wherein the loading portion of the sub cushion is provided with a diffuser configured to support the loading portion in a protruding direction at a point communicating with the passage portion, and be provided with through holes configured to distribute the inflation gas into the loading portion.

13. The airbag apparatus of claim 4, wherein the loading portion of the sub cushion is applied with a one-way vent that is formed at a point connected to the passage portion and moves the inflation gas in a loading portion direction from the passage portion.

14. The airbag apparatus of claim 1, wherein the main cushion is provided with a vent configured to selectively communicate between an internal volume with an external volume.

15. The airbag apparatus of claim 14, wherein the controller is configured to control the vent to be open during a state in which the vehicle speed is equal to or greater than the predetermined speed and a passenger puts on a belt, when detecting a front collision of less than the predetermined angle.

* * * * *